(12) United States Patent
Tjøm

(10) Patent No.: US 9,381,984 B2
(45) Date of Patent: Jul. 5, 2016

(54) APPARATUS FOR SUBSEA TRANSPORT OF SENSOR SYSTEMS

(71) Applicant: Kyrre J. Tjøm, Blommenholm (NO)

(72) Inventor: Kyrre J. Tjøm, Blommenholm (NO)

(73) Assignee: ABYSSUS MARINE SERVICES AS, Asker (NO)

( * ) Notice: Subject to any disclaimer, the term of this patent is extended or adjusted under 35 U.S.C. 154(b) by 0 days.

(21) Appl. No.: 14/399,036

(22) PCT Filed: May 6, 2013

(86) PCT No.: PCT/NO2013/000021
§ 371 (c)(1),
(2) Date: Nov. 5, 2014

(87) PCT Pub. No.: WO2013/169115
PCT Pub. Date: Nov. 14, 2013

(65) Prior Publication Data
US 2015/0151819 A1     Jun. 4, 2015

Related U.S. Application Data

(60) Provisional application No. 61/645,080, filed on May 10, 2012.

(30) Foreign Application Priority Data

May 10, 2012   (NO) .................................. 20120539

(51) Int. Cl.
*B63G 8/00*     (2006.01)
*G01V 1/38*     (2006.01)

(52) U.S. Cl.
CPC  *B63G 8/001* (2013.01); *G01V 1/38* (2013.01); *G01V 1/3852* (2013.01)

(58) Field of Classification Search
CPC ............ B63G 8/00; B63G 8/001; B63G 8/08; B63G 8/14; B63G 8/22; B63G 8/41; G01V 1/38
USPC .................................................. 114/321, 312
See application file for complete search history.

(56) References Cited

U.S. PATENT DOCUMENTS 4,281,403 A    7/1981  Siems
4,967,683 A    11/1990 Brake
(Continued)

FOREIGN PATENT DOCUMENTS

GB        2424954       10/2006
GB        2424954 A     10/2006
(Continued)

OTHER PUBLICATIONS

International Preliminary Report on patentability issued in PCT/NO2013/000021, Nov. 11, 2014, pp. 1-5.
(Continued)

*Primary Examiner* — Lars A Olson
(74) *Attorney, Agent, or Firm* — Jeffrey S. Melcher; Manelli Selter PLLC

(57) ABSTRACT

The present invention concerns an apparatus (1) for deployment and retrieval of a measurement system (8) on an ocean bottom, comprising devices for temporary storing the measurement system (8), movable control faces (7), software and devices for manoeuvring and at least one ballast tank (11A) for ballast (11B). The ballast (11B) comprises a slurry consisting of free soluble salt and a saturated solution of the salt in water, or a solid body or insoluble coarse or fine grained material.

15 Claims, 5 Drawing Sheets

(56) References Cited

U.S. PATENT DOCUMENTS

Figure 1:
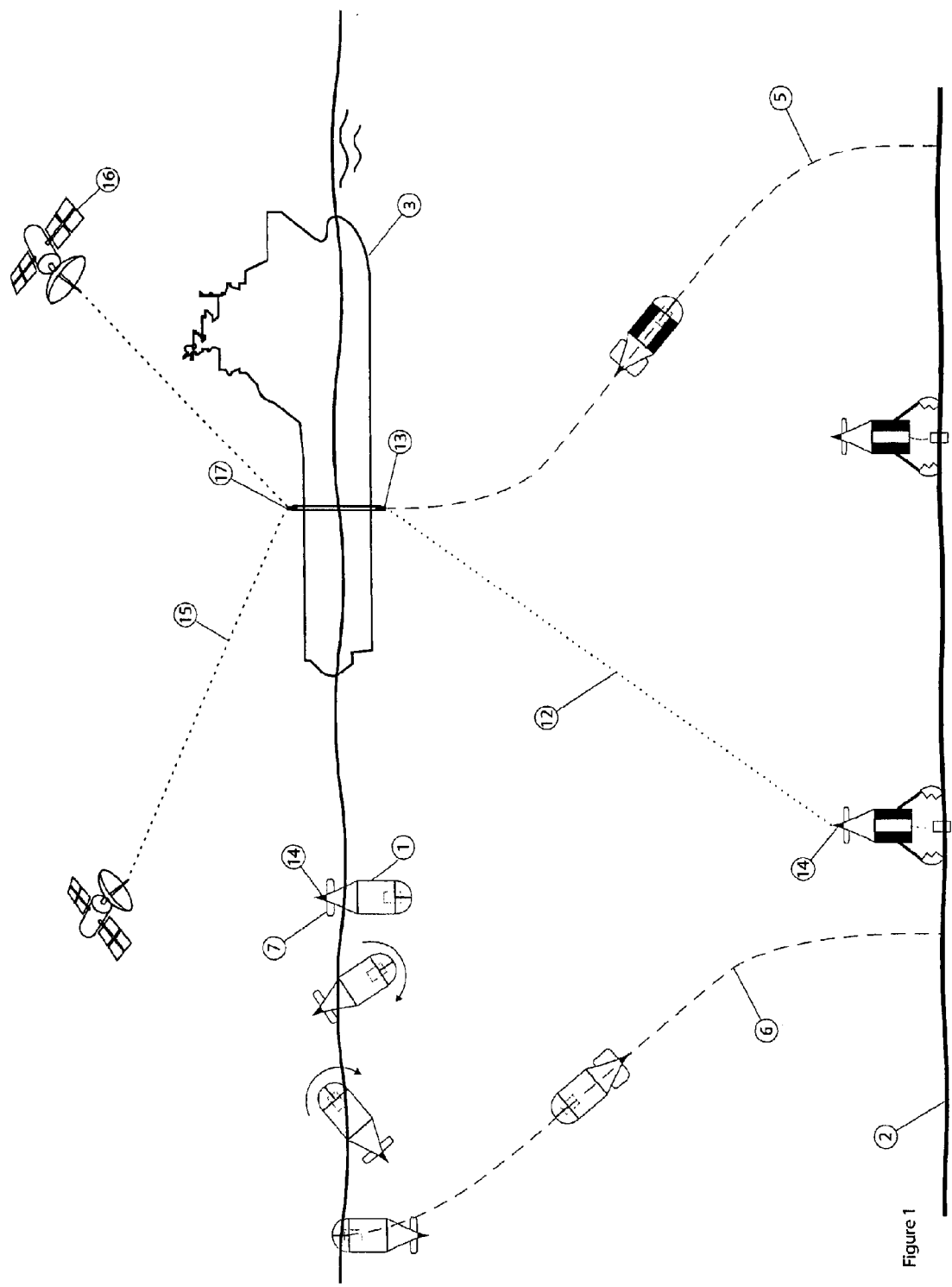

| | | |
|---|---|---|
| 5,623,455 A | 4/1997 | Norris |
| 6,625,083 B2 | 9/2003 | Vandenbroucke |
| 6,657,921 B1 | 12/2003 | Ambs |
| 6,951,138 B1 | 10/2005 | Jones |
| 2006/0256652 A1 | 11/2006 | Thomas |
| 2012/0067268 A1 | 3/2012 | Guerrero |

FOREIGN PATENT DOCUMENTS

| | | |
|---|---|---|
| WO | 00/18664 | 4/2000 |
| WO | 00/18664 A | 4/2000 |
| WO | 01/21476 A1 | 3/2001 |
| WO | 2004/063001 | 7/2004 |
| WO | 2004/063001 A | 7/2004 |
| WO | 2004/063001 A2 | 7/2004 |

OTHER PUBLICATIONS

PCT/NO2013/000021, international filing date Jun. 5, 2013, 1 page.
Norwegian Search Report issued in application No. 20120539, Dec. 10, 2012, pp. 1-2.
Norwegian Search Report issued in application No. 20120539, Jan. 30, 2015, pp. 1-2.
International Search Report issued in PCT/NO2013/000021, Feb. 8, 2013, pp. 1-3.

APPARATUS FOR SUBSEA TRANSPORT OF SENSOR SYSTEMS

The invention relates to subsea transport of equipment. More particularly, the invention regards an apparatus for autonomous deployment and retrieval of sensor systems/equipment assemblies on the seafloor and application of this for deployment and retrieval of sensor systems/equipment assemblies.

Marine seismic surveys are usually performed by firing a seismic energy source that is towed close to the surface of the sea by a vessel. The seismic energy propagates down through the subterranean formation. Part of the energy is returned to the surface after being reflected and/or refracted by the interface between different layers/discontinuities in the subterranean formation. The discontinuities are formed by interfaces between layers having different elastic properties and are termed seismic reflectors. The returned energy is recorded by seismic sensors close to the surface of the sea or on the seafloor. In the technical field regarding marine seismic surveys, two main methods are employed for recording seismic data. One method involves using hydrophone-cables ("Streamers") that are towed behind a vessel. This method records merely pressure waves (P-waves), as the shear waves (S-waves) do not propagate through water. The second method involves deploying the seismic sensors (geophones and hydrophones) on the seafloor. By this method, both P- and S-waves may be recorded, and thus additional data will be recorded and subsequently processed and used for mapping and analysis of the subterranean formation.

As the quality of the seismic data is important to provide good information about and analysis of the subterranean formation, and hence represents an important basis for assessment of, for example, potential oil and gas reservoirs, increased efforts are made to improve the measurement results. As acquiring data by means of devices on the ocean bottom provides more information than towed hydrophone-cables, there is a strong development of equipment for this kind of applications. However, the method is hampered by impractical solutions for both deploying and retrieving equipment on the seafloor.

In the following, prior art methods for obtaining marine seismic data using sensors deployed on the seafloor, so-called Ocean Bottom Seismic ("OBS") will be described. Generally, either an ocean bottom cable or separate nodes/measurement-assemblies/sensors are deployed.

An Ocean Bottom Cable ("OBC") has integrated seismic sensors and electrical and/or optical conductors from the sensors to the ocean surface, where the seismic data are recorded. The seismic energy is generated by one (or more) seismic source(s) that are deployed or towed by a separate vessel, termed the source vessel. The seismic cable is commonly attached to a vessel during the data recording. In some embodiments the cable is attached to buoy with data storage equipment or equipment for transmitting the data to a recording vessel.

A typical design of the cable connecting the different sensors disposed at intervals along the cable (typically with a distance of 25 or 50 meters) comprises electrical wires in the centre of the cable with a sturdy outer skin and comprising stress-absorbing elements. The outer skin protects the cable against damage or destruction during deployment and retrieval. A cable can be prone to leakage of water through its many connections, as the cable is assembled from sections. Handling this type of cable is time-consuming and hence costly in use. Additionally, due to the weight of the cable, there is a limitation to the maximum depth that can be surveyed. When, as a rule, several cooperating vessels are employed (vessel with the seismic energy sources, cable deployment vessel and a data-recording vessel), obtaining the data takes a long time and is very expensive. Additionally, a method is used wherein the recording unit is mounted in a buoy that also supplies the cable with the required electrical power. Then, data can be transmitted via a radio link to a vessel.

The second main method is to deploy separate sensors/nodes on the seafloor, ("OBN" or Ocean Bottom Nodes). The methods of deployment can comprise use of subsea vessels ("ROV") or by dropping the recording nodes overboard and letting them sink slowly down to the seafloor. Retrieval can then be performed by releasing a buoyancy arrangement by an acoustic or electric signal, or by releasing an anchoring weight. This also represents a very time consuming and costly method of deployment.

A further way is to connect the nodes to a rope and release the nodes together with the rope. When the recording is finished, the rope can be pulled aboard with the nodes.

There are several groups of unmanned vessels operating under water. One group of these, so-called Autonomous Underwater Vehicles ("AUVs"), can be operated without being physically connected to the surface, be it a ship, offshore platform or land-based platform. The disadvantage with this kind of vessels is that equipment, personnel and time are needed to retrieve the vehicle. Additionally, these vessels cannot perform unforeseen missions unless they are physically retrieved, reprogrammed and redeployed (WO 01/21476 A1). The second group of unmanned vessels is, as mentioned above, so-called Remotely Operated Vehicles ("ROVs") that are connected to a possible mother vessel by a cable. The vessel gets power through the cable, and the researchers can get the scientific recordings in return therethrough. The disadvantage with these vessels is the vulnerable cable and limited range of operation.

In shallow waters hydrophones and geophones connected by cables and disposed on the seafloor can be employed. These are deployed from seismic vessels by means of winches and other machines at depths down to 100 m. At greater depths, considerable powerful winches and cranes are required because the cables, which convey power out and recordings back, additionally carries heavy sensor packages. This significantly limits the profitability of conventional cable/sensor-systems in deep waters. In addition, when for example 1000 sensors are to be deployed on the seafloor in a desired pattern, this requires a substantial investment in equipment, personnel and, not the least, time.

As disclosed in U.S. Pat. No. 6,657,921 B1, many systems for collecting data from the seafloor have been proposed. In such systems, a plurality of remote seismic recording units are activated by a timer in each local recording unit together with a master clock in a central station (U.S. Pat. No. 4,281,403) and remote units connected to a plurality of receivers for collecting and transmitting seismic data over a selected transmission channel (U.S. Pat. No. 5,623,455).

U.S. Pat. No. 6,625,083 discloses a seismic sensor/node comprising both receiving equipment and transmitting equipment. Deployment, retrieval and many separate transmission units represent a substantial risk of fault in addition to that the system appears to be slow and costly to operate.

US 2011/0228635 discloses separate nodes provided with positioning devices in the form of wings and a propeller. Again, this is relatively costly equipment having lots of mechanical devices representing a substantial source of error.

US 2006/0256652 A1 discloses a method and an apparatus for disposing acquisition equipment on the seafloor according to a predetermined geometry and for retrieving the equipment. The system comprises a support vessel from which an acoustic beacon and seismic recording equipment are deployed. The vessel is enabled to control and monitor the operations, and may, if necessary, be supplemented by a separate subsea-vessel capable of accurately determining the respective positions of the equipment on the seafloor, in addition to communicating with the equipment for redistribution and collecting data. The system can also be supplemented by GPS acoustic relay buoys that comprises devices for communicating with the equipment on the seafloor (acoustic beacons) as well as with equipment on the surface (support vessel, buoys or acquisition equipment) that are brought back to the surface. These GPS buoys are claimed to be particularly useful for locating equipment brought back to the surface and shortens the time for localizing them.

The seismic acquisition equipment is deployed on the seafloor by means of an apparatus or autonomous underwater vehicle comprising a body with a hydrodynamic profile. This means it has a hemispherical lower end and tapers off toward its upper end. The body is hollow and provide with three holes through which the device is filled with water and sinks to the bottom. The spherical lower part contains acquisition equipment disposed in a sphere of hyperbaric glass as well as a battery. The space between the glass sphere and the wall of the device is filled with water that contributes to the sinking. On the narrow end rudders are provided that can either be fixed or movable. When the rudders are fixed, the device is guided toward the target by displacing the battery and thus displacing the centre of gravity of the device and thereby modifying its trajectory. Another possibility is to use movable rudders for this. In order to bring the device back to the surface, it has a ballast unit integral with a pressure resistent, watertight glass sphere above the glass sphere with the acquisition equipment. This unit comprises a volume of oil that can be displaced by means of a hyperbaric micropump with an integrated micromotor against an inflatable unit outside the glass sphere. By the disclosed displacement of oil out of the glass sphere, an equivalent volume of water is driven out of the unit and causes a buoyancy that can slow down its descent or activate its ascent to the surface. The micromotor is controlled in reply to the detection of the nearness of the seabed through the use of an echo sounder or via the reception of an acoustic message issuing from the support vessel on the surface. The disadvantage with a solution wherein the submersible apparatus contain oil is that leakages can occur that causes a contamination of the environment. The solution is slow, and the total time the unit is exposed for ocean currents substantially prolonged, which in turn causes large operational challenges and loss of accuracy both during deployment on the seafloor and by retrieval to the surface.

Common to the solutions from prior art is that they require use of a substantial amount of equipment such as cables, auxiliary devices like AUVs, ROVs, acoustic GPS relay buoys, acoustic transmission buoys and devices for conveying the sensors that are filled with material that can contaminate the environment. In addition, deployment and retrieval of measuring equipment are inaccurate and time consuming operations. There is neither a simple equipment that can be used that all depths. Also, there seems to be no known equipment where the devices for carrying the measurement systems can communicate directly with each other on the bottom without using extra acoustic transmission buoys. Thus, there is a need for simplified devices making deployment and retrieval of measurement systems from the seafloor faster and more economical.

This need is fulfilled with the present invention according to the attached claims.

The present invention relates to an apparatus for autonomous deployment and retrieval of measurement system on the seafloor in a predetermined position and using this apparatus. The apparatus is cylindrical with a circular or polygonal cross section and comprises a mid section with a rounded forward end and a frustoconical tail section provided with movable control faces, a cargo bay for storing the measurementsystem-package that is to be planted on the seafloor and surrounding tank(s) for ballast, software for manoeuvring, communication and navigation, as well as capabilities for acoustic communication.

In one embodiment, the apparatus is distinguished in that the forward end closing the cargo bay comprises the feet of the support legs when these are folded into the mid section and form a hemispherical or conical nose section, that the cargo bay is disposed axially and surrounded by that leas tone ballast tank that can communicate with the surroundings through 2-4 holes on each tank, wherein the holes can be opened and closed by actuator controlled valves or other means when the ballast is liquid, that the apparatus via the modem can communicate acoustically when deployed on the seafloor, that the ballast comprises a slurry comprising free soluble salt and a saturated solution of the salt in water, or a solid body or insoluble coarse or fine grained material, that the ballast does not contaminate the environment when released from the tank(s), that the apparatus may autonomously dispose the measurementsystem-package on the seafloor in a predetermined position independent of depth and local current conditions by manoeuvring by means of movable control faces and controlled discharge or release of ballast from the respective ballast tanks, that the support legs with the feet unfolds that landing on the seafloor and establishes a stable position independent of the inclination of the ground, and that the measurementsystem-package by its weight or in another manner is planted into the seafloor, and that the measurementsystem-package is connected to the apparatus through one or more cables. In another embodiment the measurementsystem-package can communicate wirelessly with the apparatus.

In other embodiments, the invention according to the invention is distinguished in that the cross sectional face on the mid section and the basic face of the tail section are circular, that the support legs with the feet are programmed to unfold when the apparatus approaches the seafloor in order to provide a fundament for the apparatus on the seafloor and opening the cargo bay such that the measurementsystem-package is planted into the seafloor, that the planting of the measurementsystem-package on the seafloor is due to the weight of the system-package or it being pressed down by an actuator, or by actuating the support legs, that the support legs are jointed, telescopically disposed and/or provided with auxiliary struts, preferably that the support legs are jointed and provided with auxiliary struts, that the measurementsystem-package is connected to the apparatus through one cable, that the measurementsystem-package comprises seismic sensors, preferably geophones and hydrophones, that the acoustic communication is performed both with other devices on the seafloor and the acoustic modem on the support vessel on the surface, that the support legs of the apparatus are utilized for optimal positioning for acoustic communication on the seafloor, preferably in that the optimal position for acoustic communication on the seafloor is 100 cm-200 cm, preferably 180 cm over the ocean bottom, that the ballast tanks have 2 holes for discharging ballast medium, that the ballast tanks discharge the ballast medium that the same time or separately, that the ballast medium comprises a salt and a saturated solution of the salt, preferably NaCl, that the ballast medium comprises insoluble material, preferably sand or gravel, that the ballast medium comprises a solid material, preferably concrete, that the apparatus is repositioned vertically on the seafloor by activation of the support legs and that the support legs of the apparatus are utilized for optimal positioning for planting of the measurementsystem-package on the seafloor.

I an embodiment of the use of the apparatus for autonomous deployment and retrieval of a measurement system, the apparatus is controlled by means of movable control faces and separat discharge/removal of ballast medium that is activated by software localized within the apparatus, wherein the deployment position is programmed into the software together with data for profiles of currents surface position of the apparatus is automatically acquired from GPS satellites.

In other embodiments of the application, the apparatus is optimally positioned on the seafloor for planting of the measurementsystem-package such that the measurements are not affected, in addition to optimal positioning on the seafloor for acoustic communication with other measurementsystem-pacckages and support vessels, wherein the modem for acoustic communication is dispodsed 100-200 cm, preferably 180 cm over the ocean bottom, and wherein faults in the measurement equipment is communicated to the support vessel via other deployed similar devices, wherein the apparatus during retrieval turns on the surface such that the tail section with the communications modem is above the surface of the sea, wherein 7-15, preferably 9 measurement system packages are deployed at the same time or sequentially from the same surface position, wherein the measurementsystem-package comprises seismic sensor equipment, preferably geophones and hydrophones, and wherein the measurement-system-package comprises electromagnetic equipment.

The invention will be explained in greater detail in the following with reference to the following figures:

FIG. 1 illustrates deployment and retrieval of the apparatus conveying the measurement system to and from the ocean bottom. This measurement system can be seismic sensors, so-called nodes, or other equipment for use in sub sea recordings. The reference numerals refer to the following items: 1; apparatus for subsea transport of measurement systems. 2; the ocean bottom. 3; support vessel on the surface. 5; descending trajectory. 6; ascending trajectory. 7; control face. 12; wireless acoustic connection. 13; wireless modem under the support vessel on the surface. 14; wireless modem on the apparatus on the surface and at the ocean bottom, respectively. This modem contains GPS positioning equipment, equipment for acoustic communication and equipment for radio communication. 15; GPS position connection. 16; GPS satellite. 17; GPS receiver.

Figure 2:
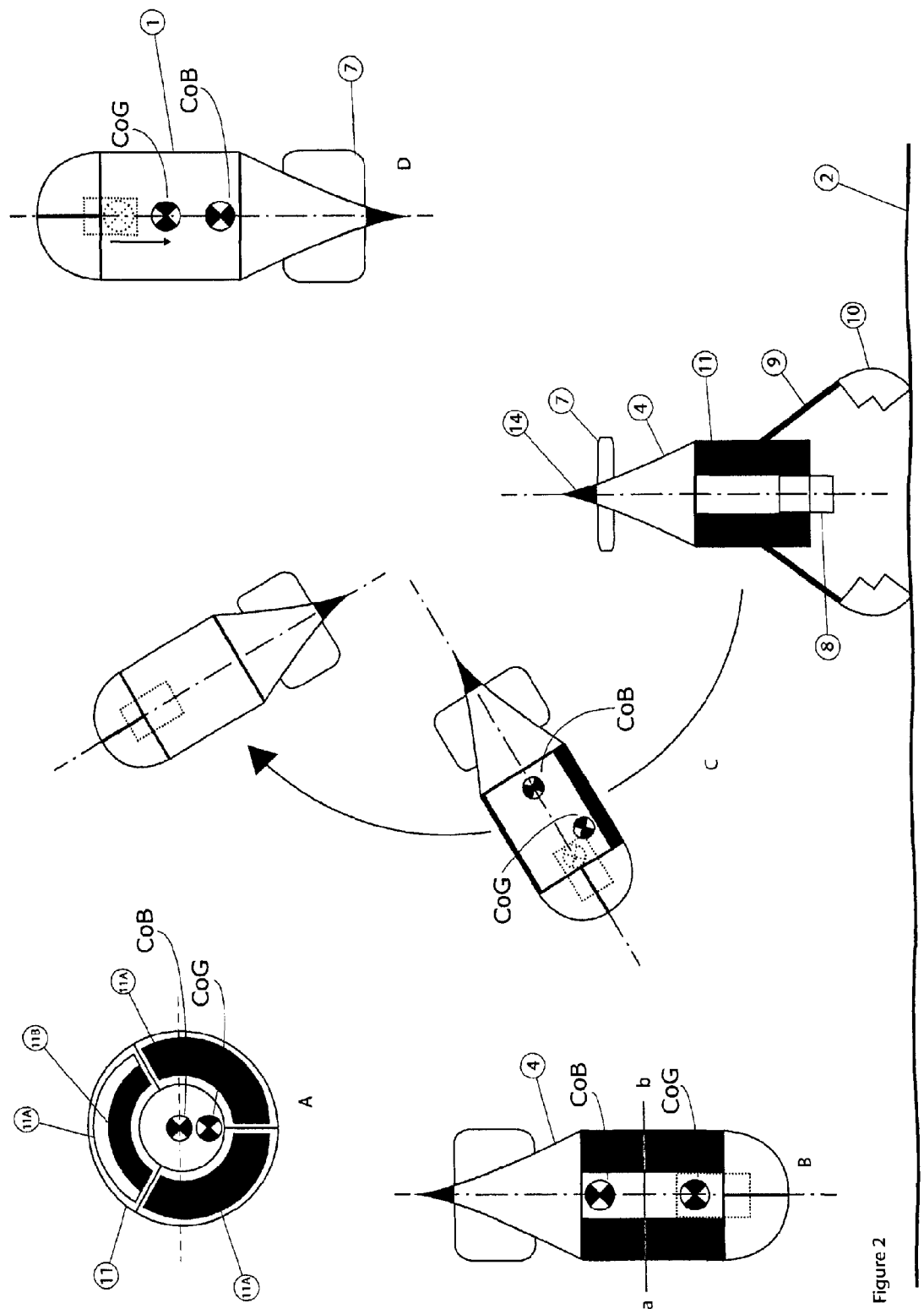

FIG. 2 (A-D) shows a longitudinal/axial section (B) and a cross section/radial (A) (line a-b on figure B) of the apparatus for transport of measurement systems showing the structure as well as control of the apparatus during displacement of centre of gravity ("CoG") and the centre of buoyancy ("CoB") during discharge or removal of the ballast tanks, and ascent of the apparatus. The reference numerals have the following meaning: 4; conical or frustoconical tail section wherein the movable control faces are mounted, and containing equipment for determining position, acoustic communication and radio communication. 11; variable ballast. 11A; ballast tank. 11B; ballast medium.

Figure 3:
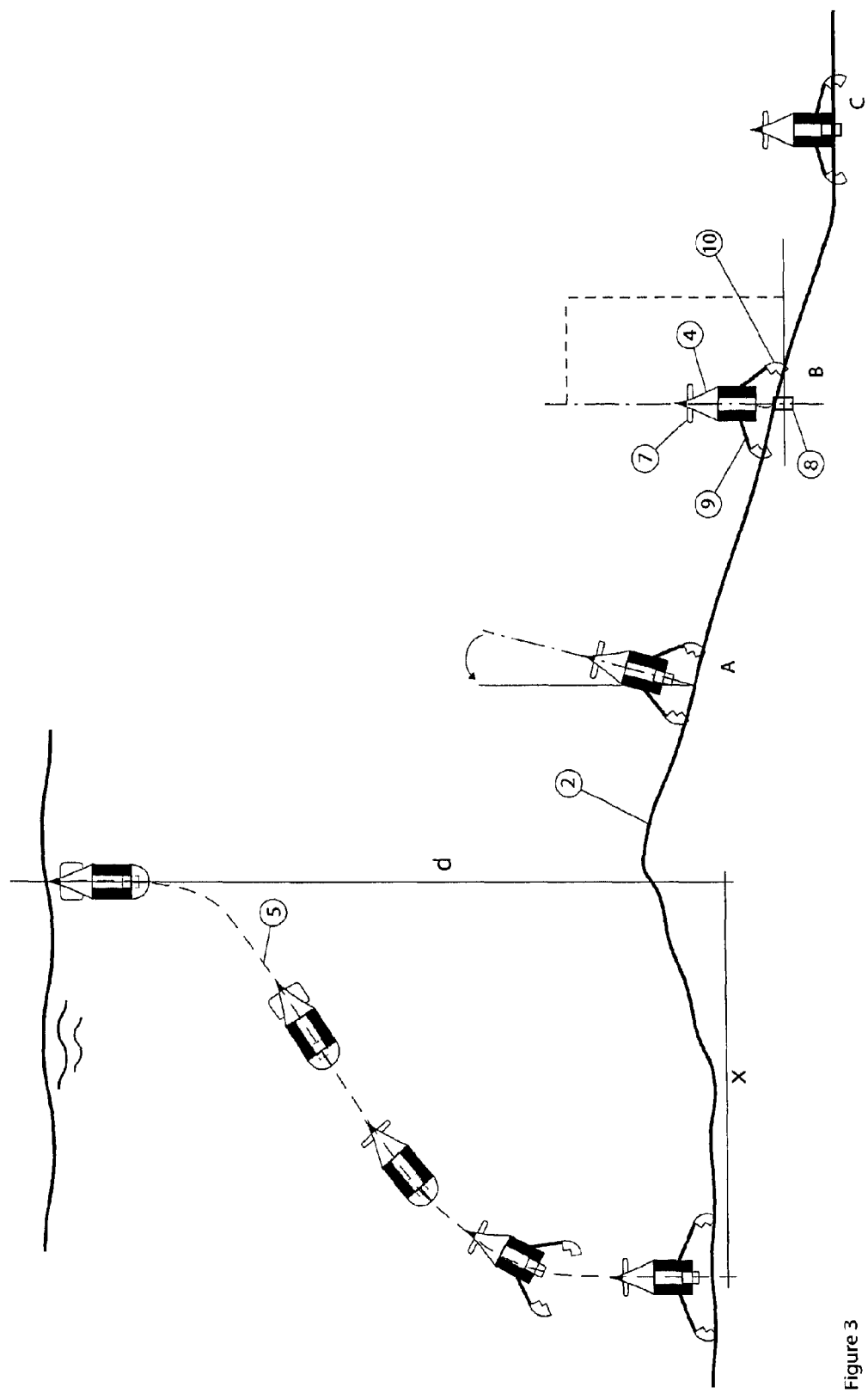

FIG. 3 (A-C) illustrates in greater detail deployment of the apparatus conveying the measurement system and its positioning on the seafloor. A and B show landing on inclined bottom, and C shows planting of measurement system-package by adjusting the support legs. The reference numerals have the following meaning: 8; measurementsystem-package. 9; support legs. 10; nosecone and feet. d and x refers to the depth determined by the apparatus and any lateral displacement from the vertical between the surface and the ocean bottom.

Figure 4:
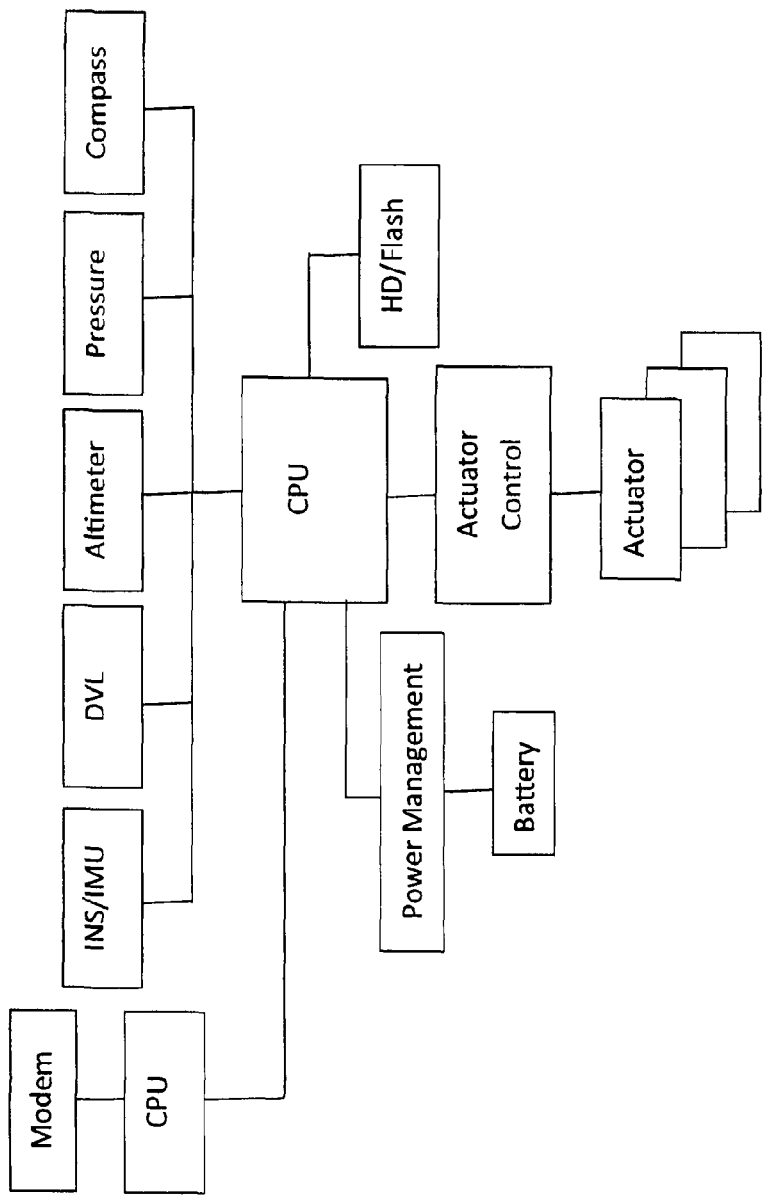

FIG. 4 shows a block diagram over the electronic components and control systems in the apparatus. Modem; modem for radio- or acoustic communication. INS/IMU; inertial sensor/inertial measurment unit. DVL; Doppler Velocity Log. Altimeter; height over the seafloor. Pressure; pressuregauge/depthgauge. Compass; compass. CPU; Central Processing Unit. HD/Flash; storage modem or hard disk. Power Management; Management of power supply. Battery; battery. Actuator Control; Control of the actuators. Actuator; Actuator.

Figure 5:
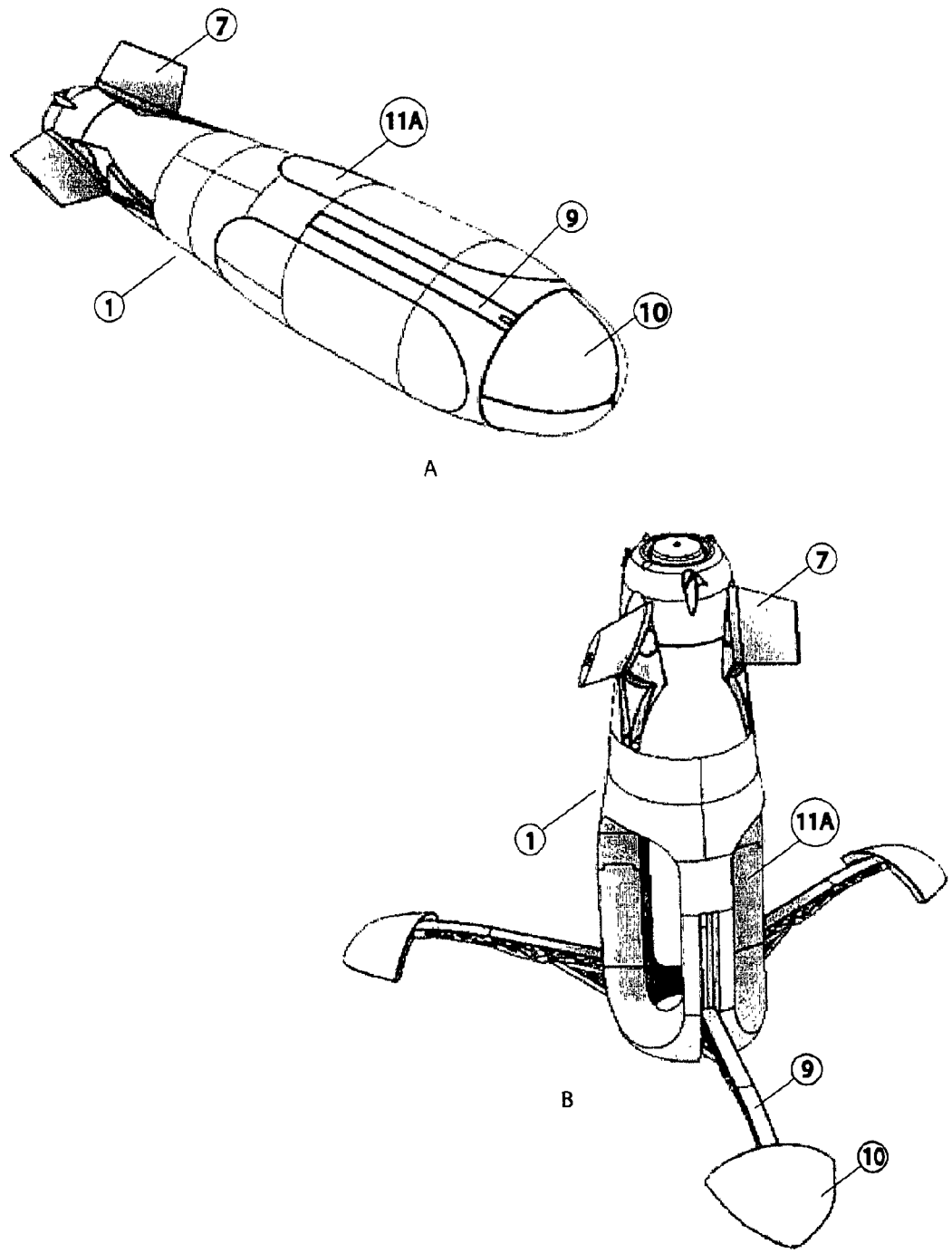

FIG. 5 shows a drawing of the apparatus ready to descend into the sea A and when disposed on the bottom with a ballast tank removed B.

As shown on FIG. 1, the present apparatus and application of the apparatus for deployment and retrieval of a measurement system on the seafloor no other elements than a support vessel and contact with GPS satellites for initial and accurate determination of position, as opposed to what is known from prior art. The measurement system is configured as a package and can, for example, comprise seismic sensor equipment, such as geophone and hydrophone, or other relevant systems, for example an acoustic transmitter and/or receiver, environment monitoring sensors, water samplers, and/or Doppler Velocity Log. When the position for deployment is determined, the apparatus according to the invention 1, which is loaded with a measurementsystem-package 8, will be submersed into the sea, regardless of depth, and sink toward the seafloor due to gravity. The apparatus has integrated software (FIG. 4) that is programmed with the position (geographic reference) to the landing spot on the seafloor and data for current-conditions. On the surface, the position of the apparatus is recorded by means of GPS satellite, and on its way toward the seafloor, it compensates automatically for leeway such that is lands at the predetermined position. Any current is compensated for, as illustrated by 5 in FIG. 3, by means of actuators acting on the movable control faces 7 and discharging ballast 11B from a suitable ballast tank 11A. The apparatus can communicate with the support vessel and receive measurements of current-profile performed with suitable measuring equipment (Acoustic Doppler Current Profiler) on the vessel. When the apparatus according to the invention approaches the seafloor, the rudders will automatically be oriented transversely and the apparatus will be slowed. The support legs 10, that are folded together and wherein the feet form a combined (for example three-part) conus-shaped, but not water tight lid for the storage bay and thus form a hemispherical or conical forward end part on the apparatus, unfold by means of a suitable actuator (not shown), and establishes a stable position independently of the inclination of the ocean bottom. After the apparatus has landed on the seafloor in correct position, the measurement system 8 is dropped down on the seafloor. The package can, for example, comprise a seismic sensor package weighing from 800 g to 1.5 kg in water and will penetrate into the seafloor to various degrees provided the seafloor is not too hard. In another embodiment according to the invention, the measurement system is pressed into the ocean bottom by a suitable actuator, or by actuating the support legs. This is illustrated by B, C in FIG. 3. As illustrated in FIG. 1 the apparatus on the seafloor can communicate acoustically 12 with the support vessel 3 and with the other apparatus without using acoustic beacons as taught by prior art (US 2006/0256652 A1). Thus, the support vessel on the surface will receive a signal on any malfunctioning device on the seafloor. This is not known from prior art. The acoustic link 12 can utilize two distance measurements (timed communication), between and toward equipment on the ocean bottom.

The present technique is considerably timesaving with respect to prior art that relates to deployment of for example seismic sensors on the seafloor. As discussed in the introduction, deploying 1000 sensors according to prior art will require about 20-30 days, whereas deploying the same number of sensors according to the present invention will be performed in 2-5 days, wherein 7-15, preferably 9 sensors are deployed at the same time and/or from the same surface position.

FIGS. 2 A and B show a radial cross section A and an axial longitudinal section B, respectively, of the apparatus according to the invention 1 with centre of gravity CoG and centre of buoyancy CoB depicted. The apparatus comprises a mid section that may be cylindrical with a constant diameter, many-faceted with parallel sides or symmetric around the central axis. The mid section comprises a through cavity, wherein the cargo (the measurementsystem-package) is stored during transport and surrounded by at least one ballast tank 11A. This cavity may also continue up into the conical or frusto-conical tail section. The cavity is delimited by a wall from a non-compressible synthetic buoyancy material known in the art. Examples of such materials can be Divinycell from DIAB, synthetic foam from BMTI or MSB234 from Partner-Plast.

Integral with the mid section are at least 1, but preferably 3 or more ballast tanks 11A configured such that surface of the mid sections is smooth (FIG. 5-A), and the tanks are evenly spaced around the entire circumference of the mid section. Further, the ballast tanks are disposed such that the distance between the CoG and CoB is between 50 mm and 400 mm. The reason for this is that this distance affects the angle of flight and the capacity for lateral displacement. The ballast tanks may form the outer wall of the apparatus, (FIG. 5-B), or the outer wall and/or the wall facing the cargo bay may be covered by a skin layer of liquid tight material known in the art. The ballast tank(s) 11A are provided with 2-4, preferably 2 holes to the ambient environment (the sea) and the content can be replaced in from 1 to 3 minutes, but not more than 5 minutes. The holes are opened and closed by valves (not shown) controlled by actuators (not shown). The ballast tanks can also be completely released individually or collectively from the apparatus by activating suitable actuators. The ballast tanks may also have an opening with a lid for filling ballast.

The rear part of the apparatus, the tail section, has a conical shape or a frustoconical shape with a circular or polygonal basis that is hollow and that can be manufactured from the same material as the mid section. Associated with this cavity are the equipment for communication and GPS positioning, as well as the software activating the actuators that discharge/remove ballast and control of the control faces 7. On this rear part of the apparatus there are disposed movable control faces 7 that are controlled by the above-mentioned actuators (not shown). The control faces 7 are manufactured from Glass fibre reinforced plastic ("GRP") or the same material as the mid section and the tail section.

The front part of the apparatus, the nose section is comprised of the feet 10 of the apparatus' support legs 9 when they are folded into the mid section of the apparatus and form a hemispherical or conical tip. These feet 10 cover the entire circumference of the apparatus and can, for example, have a sectioned appearance ending in a tip that closes the through cavity in the mid section and forms the cargo bay. The feet can be manufactured from the same material as the apparatus, stainless metal or for example hard rubber that is hollow within and/or provided with ribs. The support legs, which may be telescopically configured, jointed and/or provided with auxiliary struts (not shown), are inset in recesses in the mid section. The support legs 9 can, for example, be manufactured from aluminium, stainless metal or titanium. The recesses can comprise longitudinal slots extending through the entire mid section or be adapted to the length of the folded support legs. Unfolding and folding the support legs are controlled by actuators (not shown). When the apparatus is deployed on the seafloor the support legs 9, with the feet 10, are unfolded and the cargo bay is opened and can release the measurementsystem-package 8, for example a seismic sensor package. This sensor package 8 is connected to the apparatus with one or more cables, preferably one cable. In another embodiment, there may be wireless communication between the sensor package and the transport apparatus 1 itself.

The ballast medium comprises a saturated salt solution that is produced in that the ballast tanks first are filled with, for example, NaCl and thereafter topped with water. If needed, NaCl is added thereafter such that the mixture comprises a slush or slurry. This is important because the ballast medium cannot be allowed to slosh within the ballast tanks as this will affect the stability of the apparatus. The final contents of the ballast tanks in filled state will comprise slurry and unsolved NaCl. Use of this kind of ballast with a saturated solution of salt permits discharging ballast without any kind of contamination of the environment surrounding the apparatus. This is new in the art. The discharge is performed in that the holes in the ballast tank(s) are opened and the ballast medium is expelled passively by seawater and/or by a propeller function. The ballast medium can also comprise concrete. In this case, the ballast tank(s) will be completely released from the apparatus when needed. The ballast medium may also comprise sand, gravel or other insoluble material.

In FIG. 2C the amount of ballast is illustrated with hatched areas on the mid section of the apparatus. Retrieval of the apparatus is initiated in that the measurementsystem-package or node 8 is pulled into the cargo bay by activating an actuator (not shown) and/or in combination with activating support legs that will raise or lower the main body from or toward the ocean bottom. Thereafter, the feet 9, 10 are folded and the apparatus remains standing on the tip formed by the three folded feet 10. The tipped shape of the feet decreases their resistance against the seafloor by the contraction and prevent that the cargo bay is filled with mud from the seafloor. The control faces 7 are turned by suitable actuators (not shown) such that they are oriented longitudinally along the apparatus. Thereafter, the ballast is discharged in a varying amount fro the tanks, which provides the apparatus with a positive buoyancy, at the same time as the CoG is moved temporarily radially out from the central axis and aft. Axially, the CoG remain in front of the CoB, but laterally oriented control faces will, once the apparatus starts to ascend vertically, impose a hydrodynamic and orienting torque on the apparatus and turn it with the nose part upward.

When the apparatus approaches the surface, the control faces will be disposed transversely in order to slow the ascent (FIG. 1), the control faces lose their hydrodynamic torque and the relationship between CoG and CoB witt turn the apparatus back with the nose section pointing vertically downward. The communications modem in the tail section is thereby disposed over the surface of the sea and enables reception of GPS-signals as well as communication between the apparatus and the support vessel.

The present apparatus is capable of autonomous landing on a desired position on the seafloor and to plant a measurement-system-package on a predetermined spot with an accuracy of at least +/−1−5 m, preferably +/−2 m. This is illustrated in FIG. 3, wherein d and x refers to depth and lateral displacement, respectively. The apparatus utilizes position determination on the surface, inertial navigation with suitable equipment and communication with the support vessel in order to receive information, for example current-profiles. While the apparatus rests on the surface with the communications modem 14 over water, a position is determined from one or more GPS satellites and the control faces 7 are initially oriented along the hull of the apparatus, which will sink toward the seafloor due to the ballast. Any departure from a calculated trajectory of descent is controlled by means of the control faces. When the apparatus approaches the seafloor, the control faces are oriented transversely in order to slow the descent, and the support legs 9 with the feet 10 are folded out and further slow the descent. As shown in FIGS. 3(A, B), the support legs can be activated to different degrees in order to correct the apparatus to a vertical position. When the measurementsystem-package is dropped down in the seafloor, the support legs are maximally extended such that the mid section is as close to the seafloor as possible (FIG. 3C) (see above). Later, the support legs can be activated to adjust the apparatus such that the modem 14 is disposed from 100 cm to 200 cm, preferably 180 cm over the ocean bottom. This provides sufficient distance between the measurement system and the apparatus itself such that the measurements are not affected. At the same time, the modem 14 is thereby disposed at a height over the ocean bottom that provides optimal possibilities for communication with other devices deployed on the seafloor and with the support vessel on the surface.

The invention claimed is:

1. Apparatus for deployment and retrieval of a measurement-equipment-package on an ocean bottom comprising:
    a tail section with movable control faces;
    a mid section with a cargo bay for storing the measurement-equipment-package;
    at least one ballast tank for ballast;
    software and devices for maneuvering; and
    support legs with feet movable between a folded position wherein they are disposed fully or partly within the mid section and an unfolded position, wherein when the support legs are in their folded position, the feet form a hemispherical or conical nose section forming a part of and closing the cargo bay, wherein the cargo bay is axially disposed and surrounded by at least one ballast tank.

2. The apparatus according to claim 1, wherein the support legs with the feet moving from the folded to the unfolded position opens the cargo bay.

3. The apparatus according to claim 1, wherein the mid section is cylindrical with constant diameter, many-faceted with parallel side or symmetric about the central axis.

4. The apparatus according to claim 1, wherein the tail section is substantially conical.

5. The apparatus according to claim 1, wherein the support legs are jointed, telescopically configured and/or provided with auxiliary struts.

6. The apparatus according to claim 1, wherein the support legs with the feet move from the folded to the unfolded state when the apparatus approaches the ocean bottom, and when landing on the ocean bottom establishes a stable position independent of the inclination of the ground.

7. The apparatus according to claim 1, wherein the control faces are automatically transversely oriented and the apparatus slowed down when the apparatus approaches the ocean floor.

8. The apparatus according to claim 1, wherein the ballast tanks are disposed such that the distance between the CoG and CoB is between 50 mm and 400 mm.

9. The apparatus according to claim 1, wherein the apparatus can deploy the measurement-equipment-package autonomously on the ocean bottom independent of depth and local current-conditions by maneuvering by means of the control faces and controlled discharge or release of ballast from the ballast tank(s).

10. The apparatus according to claim 1, wherein the apparatus is positioned vertically on the ocean bottom by activating the support legs.

11. The apparatus according to claim 1, wherein the support legs of the apparatus are utilized for optimal positioning for planting the measurement-equipment-package on the ocean bottom.

12. The apparatus according to claim 1, wherein the measurement-equipment-package during or after the landing of the apparatus on the ocean bottom is planted into the ocean bottom by means of its weight, an actuator or by actuating the support legs.

13. The apparatus according to claim 1, wherein the support legs of the apparatus are utilized for optimal positioning for acoustic communication on the ocean bottom.

14. The apparatus according to claim 1, wherein a modem for acoustic communication is disposed 100-200 cm above the ocean bottom.

15. The apparatus according to claim 1, wherein a modem for acoustic communication is disposed 180 cm above the ocean bottom.

* * * * *